(12) United States Patent
Baxley et al.

(10) Patent No.: US 6,879,565 B2
(45) Date of Patent: *Apr. 12, 2005

(54) LARGE-SCALE, FAULT-TOLERANT AUDIO CONFERENCING OVER A HYBRID NETWORK

(75) Inventors: Warren E. Baxley, Arvada, CO (US); Gregory A. Clemson, Superior, CO (US); William P. Ernstrom, Golden, CO (US); Eric J. Nylander, Morrison, CO (US); Thomas W. Stark, Englewood, CO (US); Thomas E. Yackey, Jr., Broomfield, CO (US)

(73) Assignee: Polycom, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/696,376

(22) Filed: Oct. 29, 2003

(65) Prior Publication Data

US 2004/0085913 A1 May 6, 2004

Related U.S. Application Data

(63) Continuation of application No. 09/426,382, filed on Oct. 25, 1999, now Pat. No. 6,657,975.

(51) Int. Cl.[7] .............................................. H04L 12/16
(52) U.S. Cl. ..................... 370/261; 370/352; 370/401; 379/158; 379/202.01; 709/229; 709/231
(58) Field of Search ................................ 370/259–271, 370/352, 400–402, 157–158, 202.01; 709/229, 231

(56) References Cited

U.S. PATENT DOCUMENTS 618,786 A 1/1899 Cummings
4,541,087 A 9/1985 Comstock
5,054,021 A 10/1991 Epps (Continued)

FOREIGN PATENT DOCUMENTS

EP 1077565 A1 * 2/2001 ............ H04M/3/56

OTHER PUBLICATIONS

Haojun et al., Implementing an Audio Multipoint Processor on DSP Array, May 2001, Wuhan University, China, Multimedia Network Communication Engineering Institute, pp. 441–444.*

(Continued)

Primary Examiner—Kenneth Vanderpuye
Assistant Examiner—Tri H. Phan
(74) Attorney, Agent, or Firm—Wong, Cabello, Lutsch, Rutherford & Brucculeri, LLP

(57) ABSTRACT

An audio conferencing method in a hybrid network. Input from a plurality of endpoints connected to an audio conference in the hybrid network is received in a media gateway. The media gateway converts the input to an MCU-usable format and selects input based on predetermined selection criteria. An MCU mixes the selected input with other selected input to form an output stream and a sum stream which are matched with the endpoints in the audio conference. The media gateway converts the output stream and the sum stream to an endpoint-compatible format which is returned to the endpoints in the audio conference. Audio conference participants can dial-out from the MCU to bring additional participants into the audio conference. Once established in the hybrid network, the audio conference supports full service audio conferencing. In addition, dynamic routing permits an operator to service multiple MCUs, and an audio conference participant and/or an entire audio conference to be moved between MCUs. The audio conference can also be broadcast from a streaming protocol server to passive participants.

20 Claims, 8 Drawing Sheets

U.S. PATENT DOCUMENTS

| | | | |
|---|---|---|---|
| 5,103,444 | A | 4/1992 | Leung et al. |
| 5,127,001 | A | 6/1992 | Steagall et al. |
| 5,563,882 | A | 10/1996 | Bruno et al. |
| 5,673,080 | A | 9/1997 | Biggs et al. |
| 5,680,392 | A | 10/1997 | Semaan |
| 5,812,652 | A | 9/1998 | Jodoin et al. |
| 5,909,431 | A | 6/1999 | Kuthyar et al. |
| 5,909,543 | A | 6/1999 | Tanaka et al. |
| 5,916,302 | A | 6/1999 | Dunn et al. |
| 5,917,822 | A | 6/1999 | Lyles et al. |
| 5,943,321 | A | 8/1999 | St-Hilaire et al. |
| 5,949,763 | A | 9/1999 | Lund |
| 5,950,165 | A | 9/1999 | Shaffer et al. |
| 5,978,463 | A | 11/1999 | Jurkevics et al. |
| 5,995,608 | A | 11/1999 | Detampel, Jr. et al. |
| 6,298,062 | B1 | 10/2001 | Gardell et al. |
| 6,330,321 | B2 | 12/2001 | Detampel et al. |
| 6,457,043 | B1 | 9/2002 | Kwak et al. |
| 6,728,222 | B1 * | 4/2004 | Ono .......................... 370/260 |
| 2002/0123895 | A1 * | 9/2002 | Potekhin et al. ............. 704/275 |
| 2004/0047342 | A1 * | 3/2004 | Gavish et al. .............. 370/352 |
| 2004/0071100 | A1 * | 4/2004 | Klaghofer .................. 370/261 |
| 2004/0117218 | A1 * | 6/2004 | Friedrich et al. .............. 705/5 |

OTHER PUBLICATIONS

Toga et al., Demystifying Multimedia Conferencing over the Internet using the H.323 Set of Standards, Q2/1998, Intel Architecture Labs, pp. 1–10.*

About OnLive ACS 300 [online], [retrieved on Sep. 13, 1999]. Retrieved from the Internet <http://www.onlive.com/prod/acs300/about.html>.

A Primer on the H.323 Series Standard [online], [retrieved on Sep. 10, 1999]. Retrieved from the Internet <http://www.cs.ucl.ac.uk/staff/jon/jip/h323/h323_primer.html>.

Confertech International, Sonata Teleconferencing System, The choice for large-scale applications, brochure, Jun. 1997, Westminster, Colorado.

Confertech International, Allegro Teleconferencing System, brochure, Nov. 1996, Westminster, Colorado.

Confertech International, CallExpress, brochure, Aug. 1996, Westminster, Colorado.

* cited by examiner

LARGE-SCALE, FAULT-TOLERANT AUDIO CONFERENCING OVER A HYBRID NETWORK

RELATED APPLICATION

This application is a continuation of U.S. patent application Ser. 09/426,382 filed Oct. 25, 1999 now U.S. Pat. No. 6,657,975 entitled "Large-Scale, Fault-Tolerant Audio Conferencing Over a Hybrid Network" which application is related to co-owned U.S. patent application Ser. No. 09/426,684 filed Oct. 25, 1999 entitled "Large-Scale, Fault-Tolerant Audio Conferencing in a Purely Packet-Switched Network".

BACKGROUND OF THE INVENTION

1. Field of the Invention

The present invention relates generally to the field of audio conferencing. More specifically, the present invention discloses a method for large-scale, fault-tolerant audio conferencing over a hybrid network.

2. Statement of the Problem

The most common method to route calls for an audio conference is to control a local switch in a GSTN (globally switched telephony network). That is, a physical point-to-point connection is made between each piece of equipment in the network to create an overall point-to-point connection for the call. However, such a switch-controlled application can only route calls to devices connected to the switch, limiting the overall size of the system and limiting the geographic distribution of multipoint control units (MCUs) within the system. In addition, call transfer (e.g., from one MCU to another) requires that the connection from the switch to the new endpoint be established and the path to the transferring endpoint be torn down, thus limiting its use in a large-scale audio conferencing system.

Another conventional method to route calls for an audio conference is to interface with the network signaling layer (SS7/C7) directly, allowing for very large, geographically distributed systems. However, the difficulties of interfacing directly with the GSTN signaling layer prohibit all but the largest, most innovative audio conferencing system providers from implementing such a method.

Packet-switched call routing, on the other hand, facilitates dynamic call routing and call transfer during an audio conference. That is, no dedicated point-to-point connection is required in a packet-switched network. Each packet, including the call data and associated control, is sent individually to a destination address and the physical route taken from one endpoint to another can vary from packet to packet, eliminating the need for a dedicated circuit for each call. Thus, a call can be routed or even transferred within the packet-switched network simply by renegotiating the end point address. The ability to dynamically route and transfer calls between MCUs allows for greater geographic distribution of MCUs, permits an operator to service a large number of MCUs, and allows calls to be quickly switched between MCUs (e.g., to handle overflow) without interrupting service.

With existing circuit-switched networks (i.e., GSTN) and packet-switched networks becoming more commonplace, the need exists for audio conferencing over a hybrid network (i.e., a network that links both endpoints in a circuit-switched network and endpoints in a single conference system). In addition, a need exists to establish audio conferences in a conference system (i.e., to offer enhanced audio conferencing services) that is independent of the network that the endpoint is linked through.

There is a need for audio conferencing implemented over a hybrid network that provides both scalability and fault tolerance. Specifically, a need exists to monitor a pool of MCUs to determine which MCU can best handle the conference, and to dynamically route calls within the hybrid network so that a conference participant in one conference call can be transferred to another conference call and further, entire conferences can be transferred to other MCUs in the MCU pool without interrupting the audio conference (i.e., without tearing down connections and reestablishing the connections within the hybrid network). A need also exists for audio conferencing for receive-only or passive broadcast participants. Specifically, a need exists to provide a voice stream to the endpoints connected to the conference but that do not actively participate in the conference itself (i.e., do not contribute to the conference voice stream). Yet another need exists for full service audio conferencing using both high-touch (operator assisted) or reservation based audio conferencing and automated or "ad hoc" audio conferencing using the same platform. Specifically, a need exists to provide conferencing on a reservation basis and on an impromptu basis by monitoring a pool of MCUs to efficiently establish conferences over the hybrid network.

SUMMARY OF THE INVENTION

1. Solution to the Problem.

None of the prior art references discussed above disclose large-scale, fault-tolerant audio conferencing implemented over a hybrid network.

This invention provides an audio conferencing method implemented over a hybrid network that provides scalability and fault tolerance.

A primary object of the present invention is to provide large-scale, fault tolerant audio conferencing using dynamically routed call transfer in a hybrid network. That is, the present invention monitors a pool of MCUs so that conferences can be efficiently established and routed to different MCUs when an MCU approaches capacity or when an MCU has to be taken out of service. As the audio conferencing method is implemented in a hybrid network, the destination of each audio packet can be rerouted seamlessly without interrupting the audio conference.

Another object of the present invention is to provide an audio conferencing method for receive-only or passive participants. That is, participants that do not actively contribute to the conference can be accommodated (i.e., receive the conference output or voice stream).

Yet another object of the present invention is to provide full service audio conferencing using both high-touch or reservation-based audio conferencing and automated or "ad hoc" audio conferencing on the same platform. That is, a conference need not be reserved against a dedicated MCU and instead, the method of the present invention allows a pool of MCUs to be monitored, thus allowing for both advance conference reservations and ad-hoc conferences.

2. Summary.

The present invention discloses an audio conferencing method deployable in a hybrid network. Input is received from either or both circuit-switched endpoints and packet-based endpoints in a media gateway. The media gateway converts the input, if necessary, to an MCU-usable format and selects input based on predetermined selection criteria. An MCU mixes the selected inputs with other selected inputs to form an output stream and a sum stream matched with the endpoints in the audio conference. The output stream is a sum of the selected inputs from the plurality of endpoints exclusive of the input from the corresponding endpoint. The sum stream, on the other hand, includes the selected inputs. The media gateway converts the output stream and the sum stream to an endpoint compatible format, if necessary, and returns the converted output stream to the corresponding endpoint and the converted sum stream to the other endpoints connected to the audio conference. In one embodiment, both the media gateway and the MCU are part of a bridge server.

DETAILED DESCRIPTION OF THE INVENTION

1. Overview.

Figure 1:
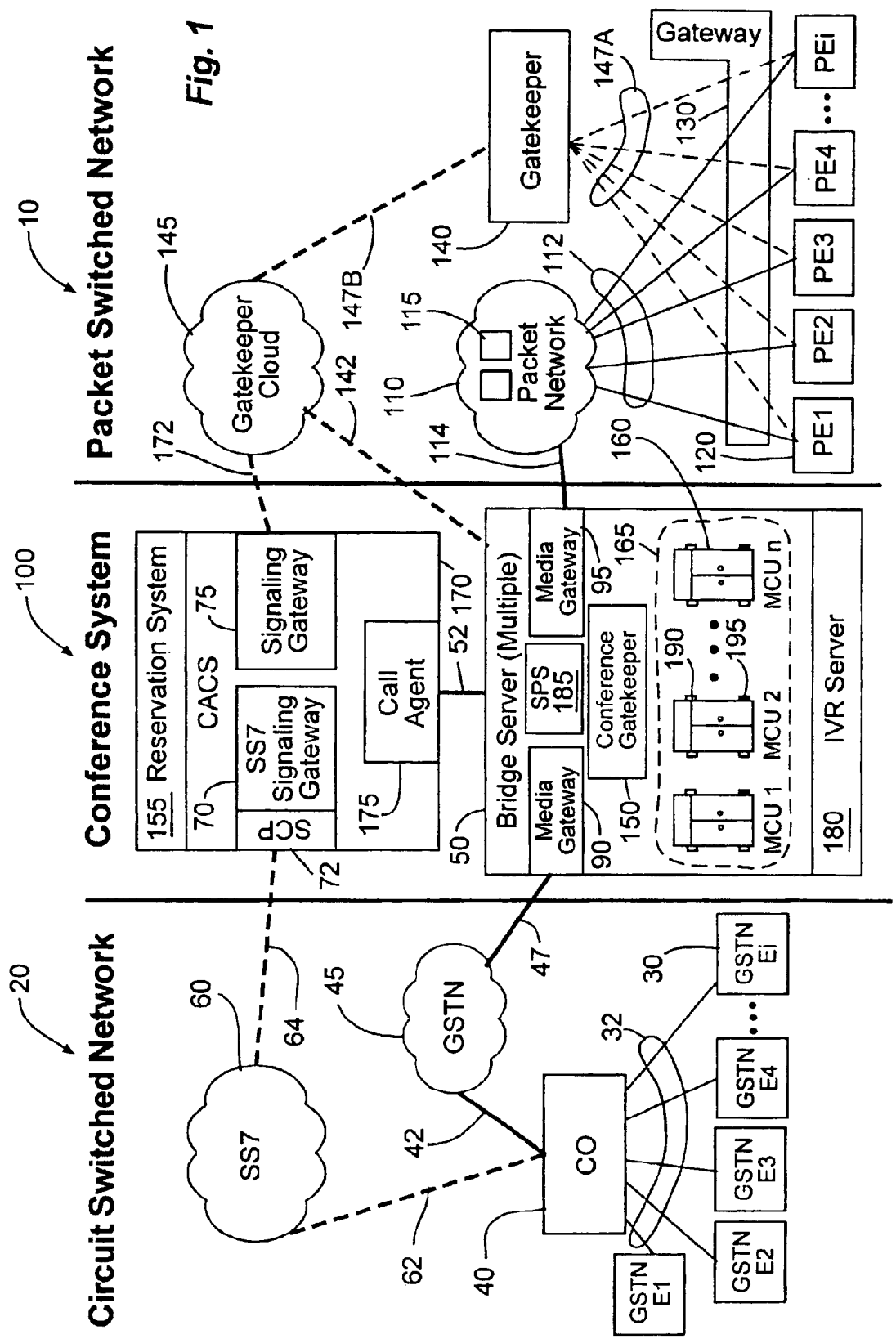
FIG. 1 is a high-level diagram of a hybrid audio conferencing system for use with the method of the present invention.

FIG. 1 shows a high-level diagram of an audio conferencing system 100 using either or both a packet-switched network 10 (e.g., Internet Protocol or IP, ATM, Frame Relay or any other packet-switched protocol) and/or a circuit-switched network 20 (i.e., an AIN network) in which the method of the present invention can be implemented. The hardware is conventionally linked by control/routing and/or audio signals in the respective network 10, 20. For purposes of illustration in FIG. 1, control or routing signals are shown by dashed lines and audio or voice stream signals are shown by solid lines. In the packet-switched network 10, a packet-based endpoint 120 (PE1, PE2, . . . PEi) accesses the conventional packet network 110 via a gateway 130 through links 112 and is conventionally linked therein through a series of routers/hubs 115 to a conference gatekeeper 150 (e.g., via 114). For purposes of clarity, the term packet-switched network 10 refers to the entire network, including, when used, the endpoints 120, the gateway 130, the gatekeeper 140 and the packet network 110. The packet network 110 is used herein to refer to the series of routers/hubs 115. In one embodiment, the gateway 130 is part of the packet network 110.

Optionally, each packet-based endpoint 120 is registered with a gatekeeper 140 through which routing signals are sent and received such as over link 147A. The packet-based endpoint 120 need not be registered with a gatekeeper 140 for the method of the present invention. However, when used, registration is conventional (i.e., under H.323). The packet-based endpoint 120 can be connected to an individual gatekeeper 140 or different gatekeepers within a gatekeeper cloud 145 (e.g., via link 147B) having one or more gatekeepers 140. The gatekeeper 140 sends routing signals to a CACS 170 via links 147, 172, while audio signals are sent through the packet network 110 via links 112, 114 to a bridge server 50 in the audio conference system 100.

A conventional circuit-switched network 20 (i.e., an AIN network) is also shown in FIG. 1 linked to the audio conference system 100 of the present invention. The circuit switched network 20 has GSTN endpoints (GSTN E1, GSTN E2, . . . GSTN En) 30 linked 32 to a central office 40 that controls the GSTN endpoints 30 and directs audio signals through the GSTN network 45 to the bridge server 50 via links 42, 47 and the control/routing signals through the SS7 cloud 60 via link 62, which converts the SS7 signals to packet signals for transmission via link 64 to the CACS 170.

Hence, the audio conference system 100 receives control/routing signals from the circuit-switched network 20 at the CACS 170 through an SCP/SS7 signaling gateway 70, 72, and control/routing signals from the packet-switched network 10 through a packet signaling gateway 75 (e.g., an H.323 compliant signaling gateway). Likewise, the audio conferencing system 100 receives audio signals through media gateway 90, 95 (e.g., for the respective network 10, 20) at a bridge server 50.

In one embodiment, the audio conference system 100 of the present invention also includes a streaming protocol server 185 (e.g., a real-time standard broadcast server (RTSP)) linked to the CACS 170 and the packet network 110, and a call agent 175 linked to the conference gatekeeper 150. The streaming protocol server 185 is conventionally available and uses the audio conference sum (i.e., the mixed voice stream from all endpoints 30, 120 actively participating in the audio conference) as input for a broadcast signal to passive participants (i.e., endpoints 30, 120 not actively participating in the audio conference). The reservation system 155 linked to the CACS 170 is also conventionally available and used to reserve planned audio conferences against an available MCU 160 (i.e., an MCU having available ports 190). Likewise, the call agent 175 is conventionally available and manages available ports 190 in the MCU pool 165 and assigns calls on an "ad hoc" basis to available MCUs 160.

The GSTN endpoint 30 is a conventionally available client terminal that provides real-time, two-way communications over a circuit-switched network 20 (e.g., AIN network). It is to be expressly understood that any circuit-switched endpoint 30 can be used and the term GSTN is used merely to distinguish endpoint 30 from packet-based endpoint 120. Similarly, the packet-based endpoint 120 is a conventionally available client terminal that provides real-time, two-way communications using packetized audio signals. Packetized audio signals contain digitized and compressed speech or touch tones. Any protocol can be used under the teachings of the present invention and the specific protocol will be based on design considerations. That is, different ITU recommendations for digitizing and compressing signals reflect different tradeoffs between audio quality, bit rate, computer power, and signal delay (e.g., G.711, G.723, etc.). In one embodiment, the endpoints 30, 120 are equipped for call signaling and call setup and support audio conferencing protocols and have MCU capabilities. In one embodiment, the packet-based endpoint 120 is also equipped with RTP/RTCP for sequencing packetized audio signals, and a RAS component (Registration/Admission/Status) to communicate with the gatekeeper 140.

The gateway 130 of the packet-network 10 is optional under the teachings of the present invention. The purpose of the gateway 130 is to provide, among other things, a translation function between conventional transmission formats (e.g., H.323, H.225.0, H.221, etc.). It is to be expressly understood that the gateway 130 can support endpoints 120 that comply with other protocols and the gateway 130 need only be equipped with the appropriate transcoders. However, the gateway 130 is not required where connections to other networks are not needed, and the packet-based endpoint 120 then communicates directly with another packet-based endpoint 120 on the same network and a single translation function is used.

Gatekeepers 140 of the packet-network 10 are also optional. Where the gatekeepers 140 are used under the teachings of the present invention, the purpose of the gatekeepers 140 is to perform two call control functions. Specifically, the gatekeeper 140 performs address translation and manages bandwidth. Address translation is done conventionally (e.g., domain name to IP address or touch tones to IP address) within the packet network 110 itself. Bandwidth is also conventionally managed within the packet network 110 itself (e.g., as IP trunks reach capacity, the network moves audio, data, etc. signals to other lower volume IP trunks). When the gatekeeper 140 is not used, endpoints are connected through the gateway 130 (i.e., for H.323) or directly through the packet network 110.

The components of the circuit-switched network 20, such as the central office 40, the GSTN network 45, and the SS7 signaling cloud 60 are conventional, as is communication therein. In one embodiment, the circuit-switched network 20 is the AIN network already deployed within the North American Network. SS7 is used to provide dynamic call routing of a call to the bridge server 50.

The signaling gateways 70, 75 are conventionally available and give the call agent or call router 175 the ability to direct inbound calls to the appropriate bridge server.

The bridge server 50 has a media gateway 90, 95 for each network it is designed to accept calls from. Thus, the bridge server 50 provides a direct audio connection between each network 10, 20 for which there is a corresponding media gateway 95, 90, and the MCU pool 165. It is to be expressly understood that the media gateway can be separately provided and need not be packaged within a single bridge server 50. Likewise, more than one bridge server 50 can be provided under the teachings of the present invention and can be linked to one another or simply linked to a common MCU pool 165. For instance, a bridge server 50 can provide a connection between the MCU pool 165 and the packet-switched network 110, and another bridge server 50 can provide the connection between the MCU pool 165 and the circuit-switched network 20. Alternatively, more than one bridge server 50 can provide connections between the MCU pool 165 and various circuit-switched networks 20 and packet-switched networks 10. The media gateways 90, 95 and bridge server 50 are conventionally available. Other configurations will occur to those skilled in the art and the method of the present invention is not to be limited by the configurations presented herein.

The conference gatekeeper 150 in conjunction with the CACS 170 control the creation and execution of audio conferences. The CACS 170 determines an available MCU 160 (i.e., having sufficient available ports 190) to host the audio conference and provides routing instructions to the conference gatekeeper 150 to direct the call from the endpoint 30, 120 to the appropriate MCU 160. For instance, if a network administrator has specified a threshold (i.e., in the CACS) 170 for the number of simultaneous audio conferences (i.e., number of active conferences, number of available ports, etc.), the CACS 170 can refuse to make any more connections once the specified threshold is reached. In addition, the CACS 170 also provides information concerning the audio conference parameters to the MCU 160 and collects billing information.

The MCU 160 supports audio conferences between three or more endpoints 30, 120. The MCU 160 is conventionally available and consists of a multipoint controller (not shown) and optionally one or more multipoint processors (not shown). For purposes of illustration, and not intended to limit the scope of the present invention, four ports 190, 195 are shown on each MCU 160. Typically, an MCU 160 can handle approximately 1,500 active conference participants. Available ports 190 are shown "open" while unavailable ports 195 are shown "closed". The MCU 160 handles negotiations between all endpoints 30, 120 to determine common capabilities for audio processing. The MCU 160 also controls audio conference resources by determining which, if any of the audio streams will be distributed to passive participants.

With respect to the audio conferencing system 100 shown in FIG. 1, an audio conference is initiated when a call identifying a particular audio conference is placed by either a packet-based endpoint 120 or a GSTN endpoint 30 on the circuit-switched network 20. Routing/control and audio signals are conventionally transmitted through the circuit-switched network 20 or the packet-switched network 10 to the CACS 170 and bridge server 50, respectively. An MCU 160 is selected by the conference gatekeeper 150 and the CACS 170 and the audio conference is established by connecting the endpoint 30, 120 to the MCU 160 through the respective network 20, 10. Additional endpoints 30, 120 can place a call identifying the audio conference and are similarly connected to the identified audio conference through the respective network 10, 20, as described in more detail below.

It is to be expressly understood that each of the hardware components of the audio conferencing system 100 described above are conventionally available, and it is the arrangement and/or configuration of each component in the manner described above, and the method of using each component in this configuration as explained below that is new. Likewise, communication using packetized signals and various protocols is conventionally known. It is the combination of each of the above-identified hardware components to form the audio conferencing system 100 for use with the method of the present invention that is new. It is also to be expressly understood that alternative hardware configurations are possible under the teachings of the present invention and that the method of the present invention is not to be limited by the configuration shown in FIG. 1 nor by any particular network protocol.

2. Establishing a Conference.

Figure 2:
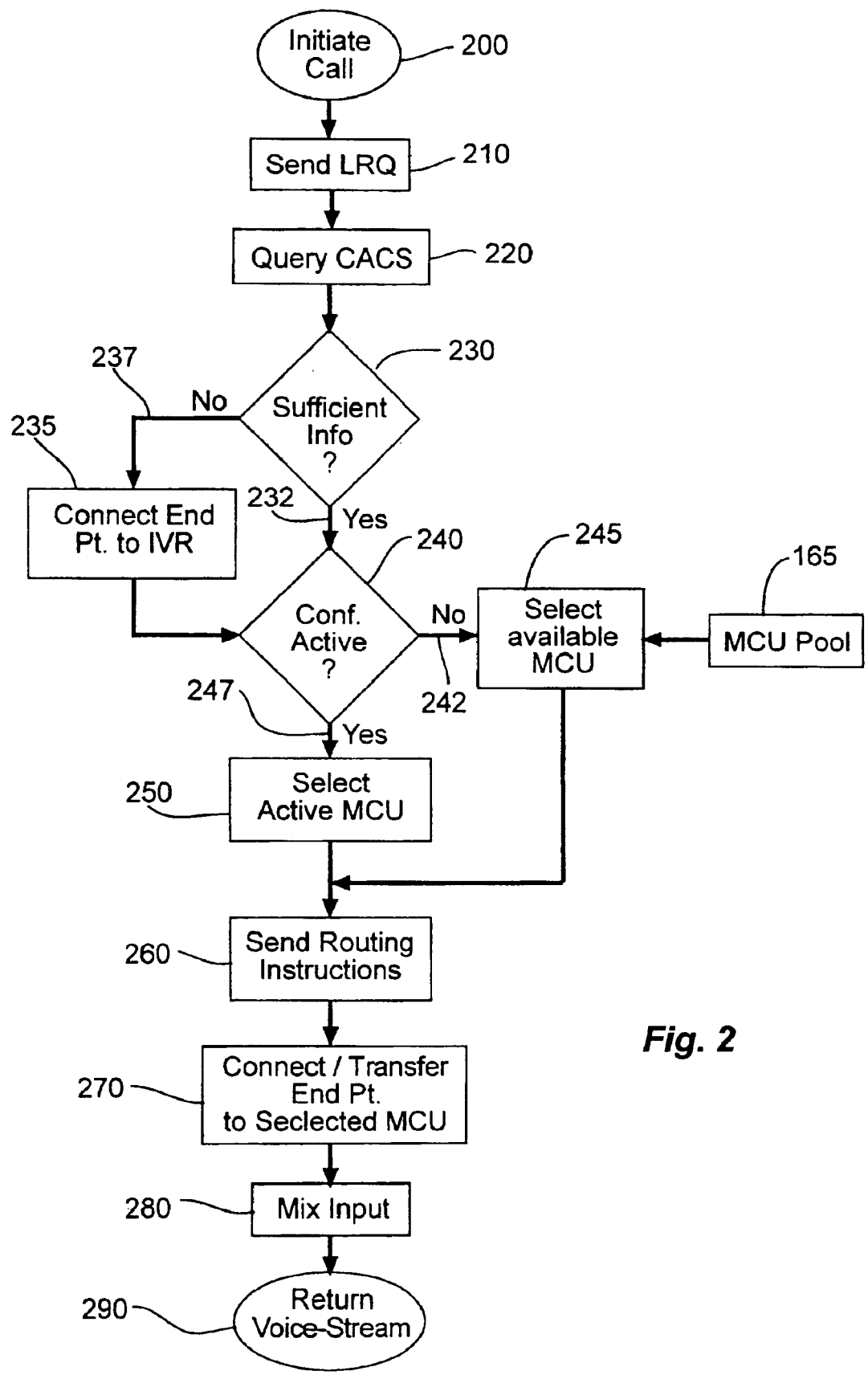
FIG. 2 is a flow chart illustrating an audio conferencing method using packet-based endpoints.

A method to establish an audio conference from the packet-based network 10 is shown in FIG. 2 and illustrated with reference to FIG. 1. At step 200, an endpoint 120 initiates a call to the audio conferencing system 100, for example, by entering a destination, account number, URL, or IP address, via links 147, 172 (or links 112, 114 where the gatekeeper 140 is not used). The gatekeeper 140 conventionally services the endpoint 120 (i.e., according to H.323). Otherwise, the call is routed directly (links 112, 114) through the packet network 110. Either way, the call is routed to the conference gatekeeper 150 in step 210. The call contains conventional packetized control signals for routing the call including any audio conference identification information required to initiate the audio conference (i.e., a conventional location request or LRQ). For example, see co-owned U.S. patent application Ser. No. 09/366,355 and Ser. No. 08/825,477 (hereinafter, the on-demand teleconferencing methods), incorporated herein by reference. The LRQ is received by the conference gatekeeper 150 via links 147, 142 (or links 112, 114 where the gatekeeper 140 is not used) which in turn queries the CACS 170 for audio conference routing instructions in step 220. The CACS 170 determines whether the call (i.e., the LRQ) contains sufficient information to set up and route the audio conference in step 230. If the call contains sufficient information 232 (i.e., enough information to uniquely identify a subscriber, such as a subscriber identification, pass code, etc.), the CACS 170 determines whether the indicated audio conference is active (i.e., whether other endpoints 120 are currently connected to the indicated audio conference) in step 240. That is, the CACS 170 starts all conferences with the MCU 160 and thus stores all activity in memory. If a CACS 170 is disconnected from an MCU 160, a conventional process is used to resync the CACS 170 and the MCU 160, and thus the CACS 170 is continuously updated with respect to activity in the MCU pool 165. If the CACS 170 determines that the indicated audio conference is not active 242, the CACS 170 selects an available MCU 160 from the MCU pool 165 to host the audio conference in step 245. In step 260, the CACS 170 then returns routing information to the conference gatekeeper 150 via link 52 and the conference gatekeeper 150 responds to the packet-based endpoint 120 via links 114, 112 with a conventional location found signal (LCF) indicating the selected MCU 160 to host the audio conference. The packet-based endpoint 120 then establishes a point-to-point call via the packet network 110 with the selected MCU 160 in step 270, and an audio conference is established with one participant (i.e., the initiating endpoint) via links 112, 114. In step 280, the MCU 160 mixes the input from all endpoints 120 participating in the audio conference, and the MCU 160 returns a voice stream to the packet-based endpoint 120 in step 290 over links 114, 112. The term "voice stream" as used herein, means the mixed sum of input from all actively participating endpoints 120 in the conference. Further, the voice stream returned to an actively participating endpoint 120 does not include input from the same endpoint 120.

Additional endpoints 120 can join an active audio conference in a manner similar to that outlined above. That is, an additional packet-based endpoint 120 initiates over link 147 (or links 112 where the gatekeeper 140 is not used) a call to an address identifying the audio conference in step 200. A conventional LRQ is sent either via the gatekeeper 140 (e.g., links 142, 147) or the packet network 110 (e.g., links 114, 112) to the conference gatekeeper 150 as discussed above. The conference gatekeeper 150 queries the CACS 170 via link 52 for routing instructions in step 220. If there is sufficient information to set up and route the audio conference in step 230, the CACS 170 proceeds to determine whether the audio conference is active in step 240, selects the active MCU 160 in step 250 if the audio conference is active 247, and responds via link 52 with appropriate routing instructions to the conference gatekeeper 150 in step 260. The conference gatekeeper 150 responds over links 114, 112 to the packet-based endpoint 120 with a conventional LCF signal indicating the selected MCU 160 hosting the active audio conference and the packet-based endpoint 120 establishes a point-to-point call over links 112, 114 with the selected MCU 160 in step 270, as discussed above. The MCU 160 mixes the input from each packet-based endpoint 120 in the audio conference in step 280 and returns an appropriate voice stream to each packet-based endpoint 120 participating in the audio conference in step 290 over links 114, 112. Additional endpoints can continue to join the audio conference in a similar manner to that just described.

Figure 3:
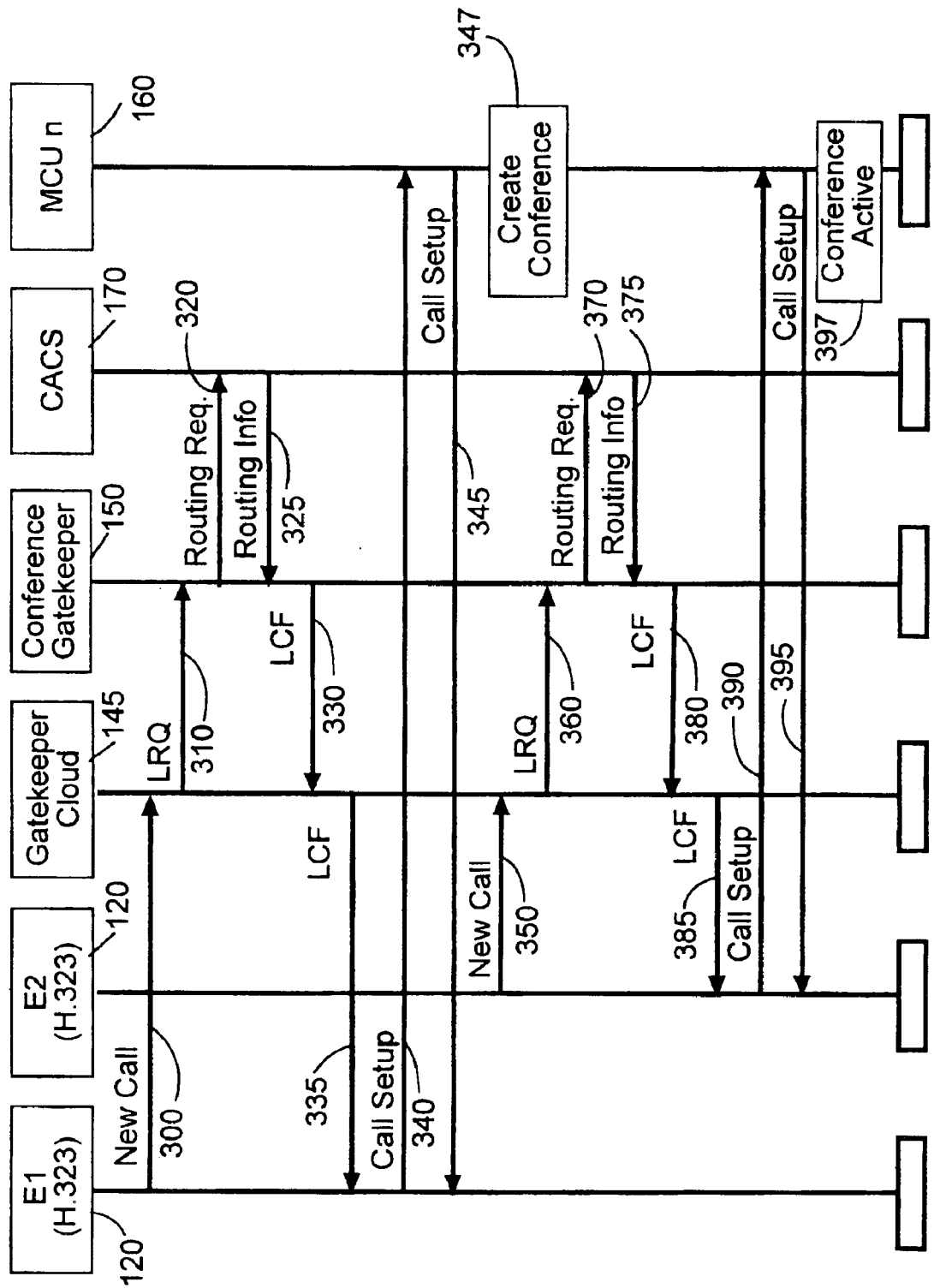
FIG. 3 shows an example of the audio conferencing method of FIG. 2 in which an IVR server is not used.

An example of establishing an audio conference from the packet-based network 10 in which there is sufficient information associated with the call (i.e., an IVR server 180 is not required to gather additional information such as an account number) is shown in FIG. 3. A new call identifying the audio conference (e.g., containing a URL, conference access number, etc.) is placed 300 from a packet-based endpoint 120 (e.g., PE1, an H.323 compliant endpoint in this example) to a gatekeeper 140 in the gatekeeper cloud 145 via links 147A, 147B (step 200). An LRQ is transmitted 310 from the gatekeeper cloud 145 to the conference gatekeeper 150 via link 142 (step 210), which in turn requests 320 routing instructions from the CACS 170 via link 52 (i.e., requesting details for the LCF) (step 220). The CACS 170 selects an available MCU 160 from the MCU pool 165 (steps 230, 240, and 245) and returns 325 routing information to the conference gatekeeper 150 via link 52, which in turn forwards 330 an LCF signal through the gatekeeper cloud 145 and back 335 to the packet-based endpoint 120 (PE1) via links 142, 147. The packet-based endpoint 120 (PE1) uses the LCF to setup 340, 345 a point-to-point connection with the MCU 160 identified by the LCF signal and establish the requested audio conference 347 (i.e., an audio conference having only the initiating endpoint PE1) via links 112, 114 (steps 270, 280, and 290). For example, see the on-demand teleconferencing methods, incorporated herein by reference. Additional endpoints 120 (i.e., PE2) join the established audio conference 347 as follows. A new call identifying the established audio conference 347 is placed 350 to the gatekeeper cloud 145 via links 147A, 147B (step 200). An LRQ is transmitted 360 from the gatekeeper cloud 145 to the conference gatekeeper 150 via link 172, 52, which in turn requests 370 routing instructions to the established audio conference 347 from the CACS 170 via link 52 (step 220). The CACS 170 selects the active MCU 160 identified as hosting the requested audio conference (steps 230, 240, and 250) and returns 375 routing instructions identifying the MCU 160 hosting the audio conference 347 to the conference gatekeeper 150 via link 52, which in turn forwards 380, 385 an LCF signal through the gatekeeper cloud 145 to the packet-based endpoint 120 (PE2) via links 142, 147 (step 260). The packet-based endpoint 120 (PE2) uses the routing information from the LCF to establish a connection 390, 395 to the appropriate MCU 160 via links 112, 114, and an active audio conference 397 is established (i.e., between PE1 and PE2) (steps 270, 280, and 290). Additional endpoints 120 (PE3, PE4, ... PEi) can participate in the active audio conference 397 by accessing the appropriate MCU 160 as just described with respect to the packet-based endpoint 120 (PE2) or through a dial out request, as described below. It is to be expressly understood that the above example is presented to be illustrative of audio conferencing in a packet-switched network 10, and in no way should be interpreted to limit the scope of the present invention.

Alternatively, also shown in FIG. 2, where the call does not contain sufficient information 237 (i.e., additional information such as an account number is required), the packet-based endpoint 120 must first connect to an IVR server 180 capable of gathering the required information in step 235 (e.g., by querying the packet-based endpoint 120 for an account number). Routing proceeds as described above with respect to steps 240 through 260 and in step 270, the packet-based endpoint 120 is then transferred from the IVR server 180 to the MCU 160 selected in step 245 or 250 before mixing the input and returning a voice stream in steps 280 and 290, respectively. Thus, there is no requirement to collocate the device gathering the information and the MCU 160 which will be the final destination.

Figure 4:
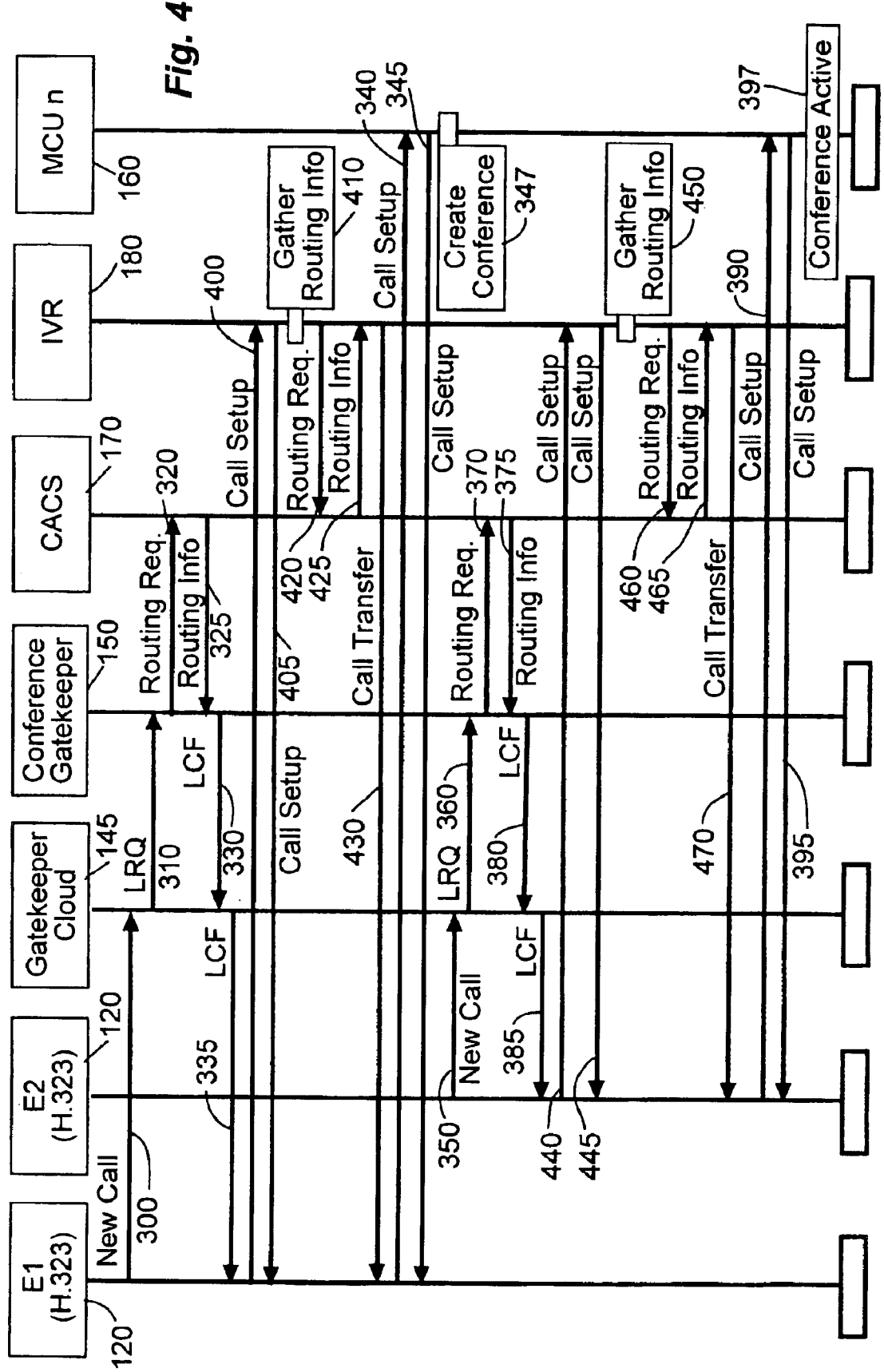
FIG. 4 shows an example of the audio conferencing method of FIG. 2 in which an IVR server is used.

An example of establishing an audio conference from the packet-switched network 10 in which an IVR server 180 is used is shown in FIG. 4. Steps 300, 310 and 320 in FIG. 4 correspond to those shown in FIG. 3. However, in FIG. 4, the CACS 170 determines that the routing request contains insufficient information to establish an audio conference. Hence, a signal is returned (325, 330, and 335) to the packet-based endpoint 120 (PE1) via links 142, 147 to route the packet-based endpoint 120 (PE1) to an IVR server 180. The packet-based endpoint 120 (PE1) establishes a connection with the IVR server 180 (400 and 405) via links 112, 114, and the IVR server 180 gathers 410 additional information (e.g., an account number) from the packet-based endpoint 120 (PE1) to establish an audio conference (step 235). Once the IVR server 180 has gathered this information, the IVR server 180 sends 420 a routing request to the CACS 170 via link 52, which in turn returns 425 routing information to the IVR server 180 via link 52 (steps 240, 245, and 260). Based on the routing information, the call is then transferred 430 from the IVR server 180 and a point-to-point connection is established 340, 345 between the packet-based endpoint 120 (PE1) and the MCU 160 and an audio conference is established 347 over links 112, 114 (steps 270, 280, and 290). Additional endpoints 120 (e.g., PE2) join the audio conference again by placing 350 a call through 360 the gatekeeper cloud 145 to the conference gatekeeper 150 (step 200) via links 147, 142 (or links 112, 114 where the gatekeeper 140 is not used). Again, the conference gatekeeper 150 requests 370 routing information from the CACS 170 via link 52 and is provided 375 with routing information to an IVR server 180 for obtaining additional information from the packet-based endpoint 120 (PE2) (steps 210, 220, 230, 237). The LCF is transmitted 380, 385 to the packet-based endpoint 120 (PE2) via links 142, 147 (or links 114, 112 where the gatekeeper 140 is not used) and a call is established 440, 445 between the packet-based endpoint 120 (PE2) and the IVR server 180. The IVR server 180 gathers 450 the additional information (i.e., an account number, access code, etc.) from the packet-based endpoint 120 (PE2) and transmits 460 a routing request to the CACS 170 (step 235). The CACS 170 responds 465 with routing information identifying the MCU 160 hosting the audio conference, and the call is then transferred 470 from the IVR server 180 to the identified MCU 160, a point-to-point connection is established between the packet-based endpoint 120 (PE2) (steps 240 to 290, discussed above). It is to be expressly understood that the above example is presented to be illustrative of an audio conferencing method, and in no way should be interpreted to limit the scope of the present invention.

Communication with the gateway 130 and the gatekeeper 140, and address resolution is conventional. Furthermore, it is to be expressly understood that the use of the gateway 130 and the gatekeeper 140 is optional and need not be used under the teachings of the present invention. In an embodiment where the gateway 130 and the gatekeeper 140 are not used, the call is routed directly through the packet network 110 (e.g., between routers/hubs 115).

Under the teachings of the present invention, an audio conference can also be established (not shown) through the circuit-switched network 20 to interface with the audio conferencing system 100. A call is placed by a GSTN endpoint 30. Routing/control signals are conventionally transmitted through the circuit-switched network 20 to the audio conferencing system 100). For an example, see the on-demand teleconferencing methods, incorporated herein by reference.

3. Dial-out Method.

Figure 5:
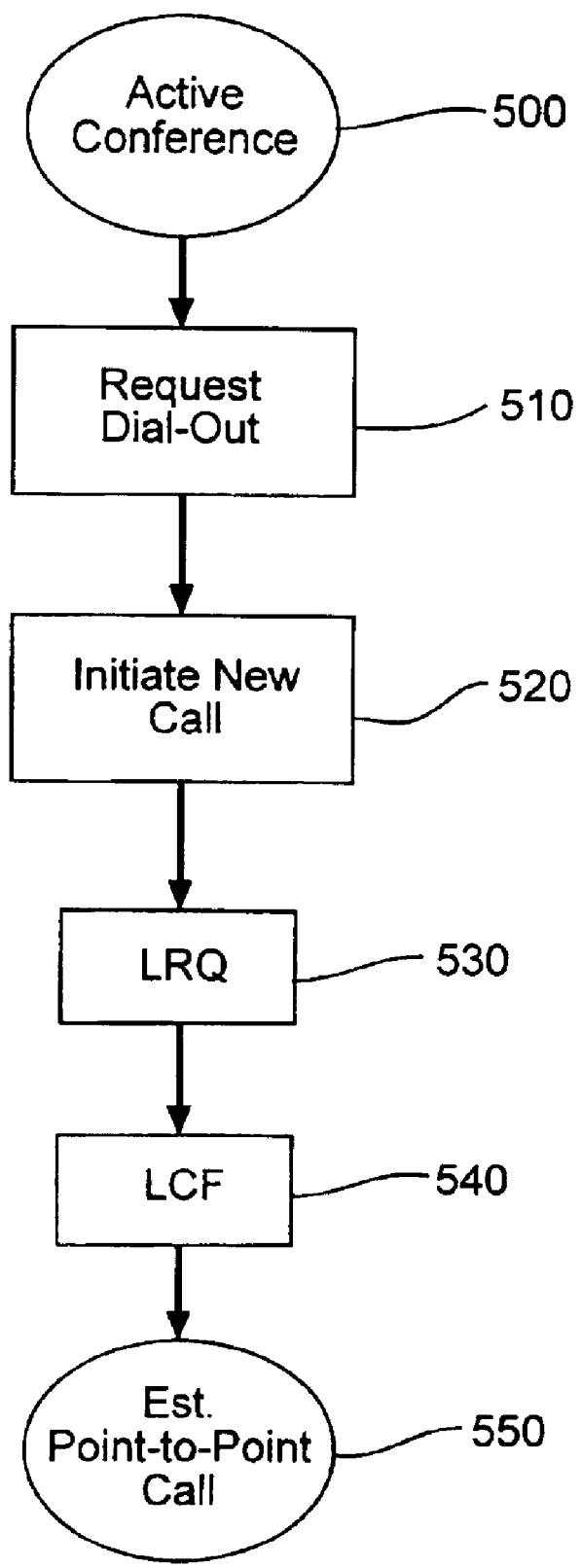
FIG. 5 is a flow chart illustrating a dial-out method using packet-based endpoints.

A method to dial-out from the audio conference system 100 of the present invention is illustrated in FIG. 5. The dial-out method is used to connect to a packet-based endpoint 120 not currently connected to an active audio conference via links 112, 114. Again, the dial-out method can be modified for use with the GSTN endpoint 30. For an example, see the on-demand teleconferencing methods, incorporated herein by reference. For example, the dial-out method can be used when an active audio conference exists 500 between audio conference participants (e.g., PE1, PE2, and PE3) and the audio conference participants wish to bring in an additional participant (e.g., PE4).

In step 510, a conference participant conventionally initiates the dial-out from an originating endpoint (e.g., PE1, via touch tone or a web interface) and the CACS 170 requests a dial-out from the MCU 160 and supplies the MCU 160 with the address of the packet-based endpoint 120 to connect to (e.g., PE4) via link 52. The MCU 160 initiates a new call request to the conference gatekeeper 150 in step 520 via links 147, 142, 52 (or links 112, 114 where the gatekeeper 140 is not used). In step 530, the gatekeeper 140 (or packet network 110) receives an LRQ from the conference gatekeeper 150 and in step 540 the gatekeeper 140 (or packet network 110) returns the destination address (i.e., via an LCF message) via link 52 which is forwarded to the MCU 160 from the conference gatekeeper 150. The MCU 160 then establishes a point-to-point call to the packet-based endpoint 120 (PE4) via links 112, 114 and mixes the input to form a voice stream for all audio conference participants (PE1–PE4) in step 550, similar to that described above with respect to establishing an audio conference. Thus, the additional participant (PE4) is brought into the active audio conference. If the additional participant (PE4) does not answer the dial-out request, the line is disconnected by the originating endpoint (PE1) and the originating endpoint (PE1) is placed back in the audio conference.

Figure 6:
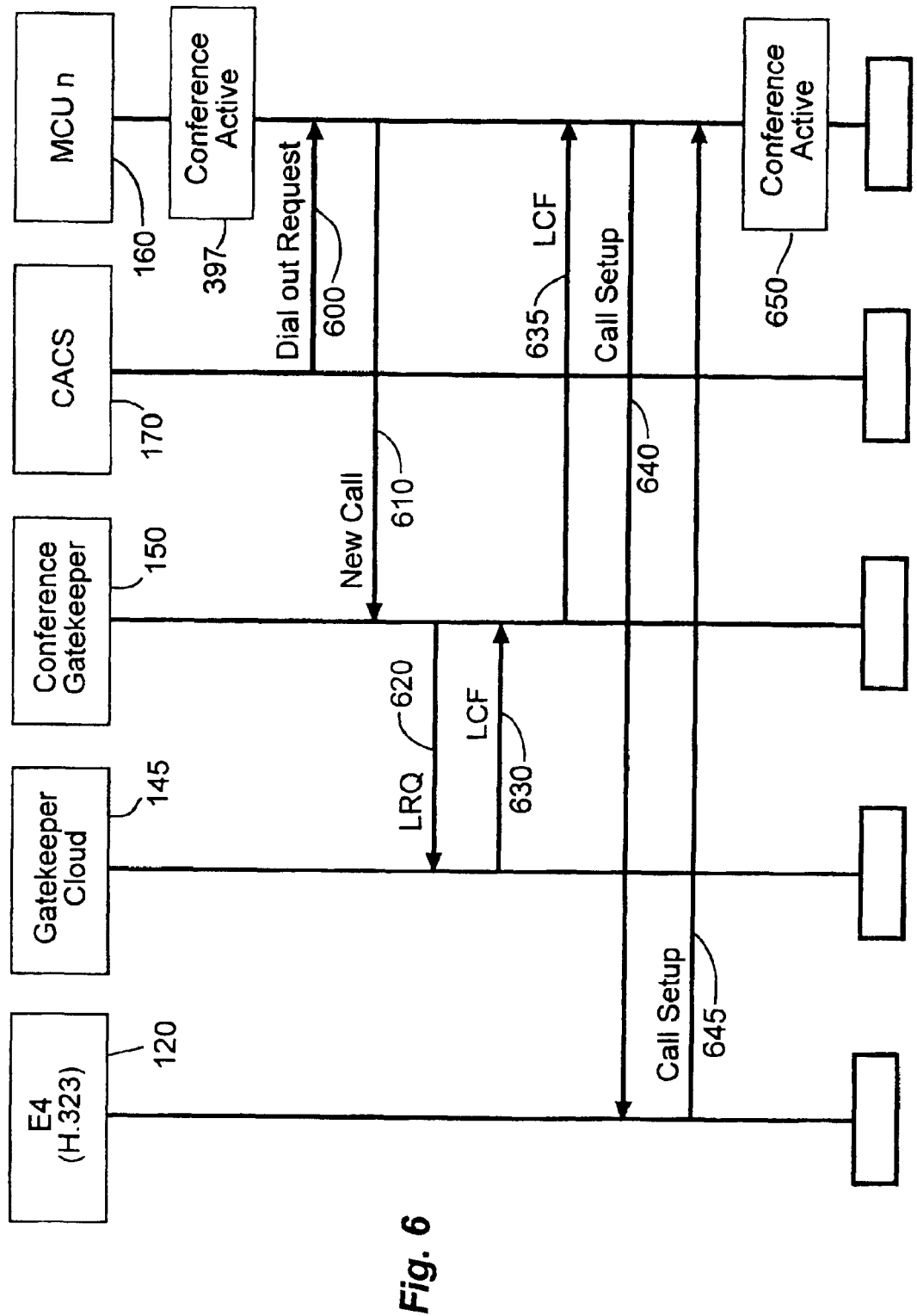
FIG. 6 shows an example of the dial-out method of FIG. 5.

An example of a dial-out method from the packet-switched network 10 is shown in FIG. 6. In this example, an active audio conference 397 has already been established (i.e., according to the method of establishing an audio conference discussed above), and the existing participants (e.g., PE1–PE3) wish to bring in an additional packet-based endpoint 120 (PE4) to participate in the active audio conference 397 (step 500). An initiating endpoint (e.g., E1) places a call identifying the additional endpoint (e.g., E4). The CACS 170 requests 600 a dial-out from the MCU 160 via link 52 (step 510). The MCU 160 transmits 610 the new call to the conference gatekeeper 150 via link 52 (step 520), which in turn requests 620 the location of the desired packet-based endpoint 120 (PE4) from the gatekeeper cloud 145 via links 52, 172. The gatekeeper cloud 145 responds 630 to the conference gatekeeper 150 with an LCF signal via links 172, 52 (step 530) which is in turn transmitted 635 to the MCU 160 (step 540). The MCU 160 then uses the information from the LCF to establish 640, 645 a point-to-point call between the MCU 160 and the packet-based endpoint 120 (PE4) via links 112, 114. Hence, the packet-based endpoint 120 (PE4) is brought into the active audio conference 650 as an additional participant (step 550). It is to be expressly understood that the above example is presented to be illustrative of an audio conferencing method, and in no way should be interpreted to limit the scope of the present invention.

4. Hybrid Conferencing Method.

Figure 7:
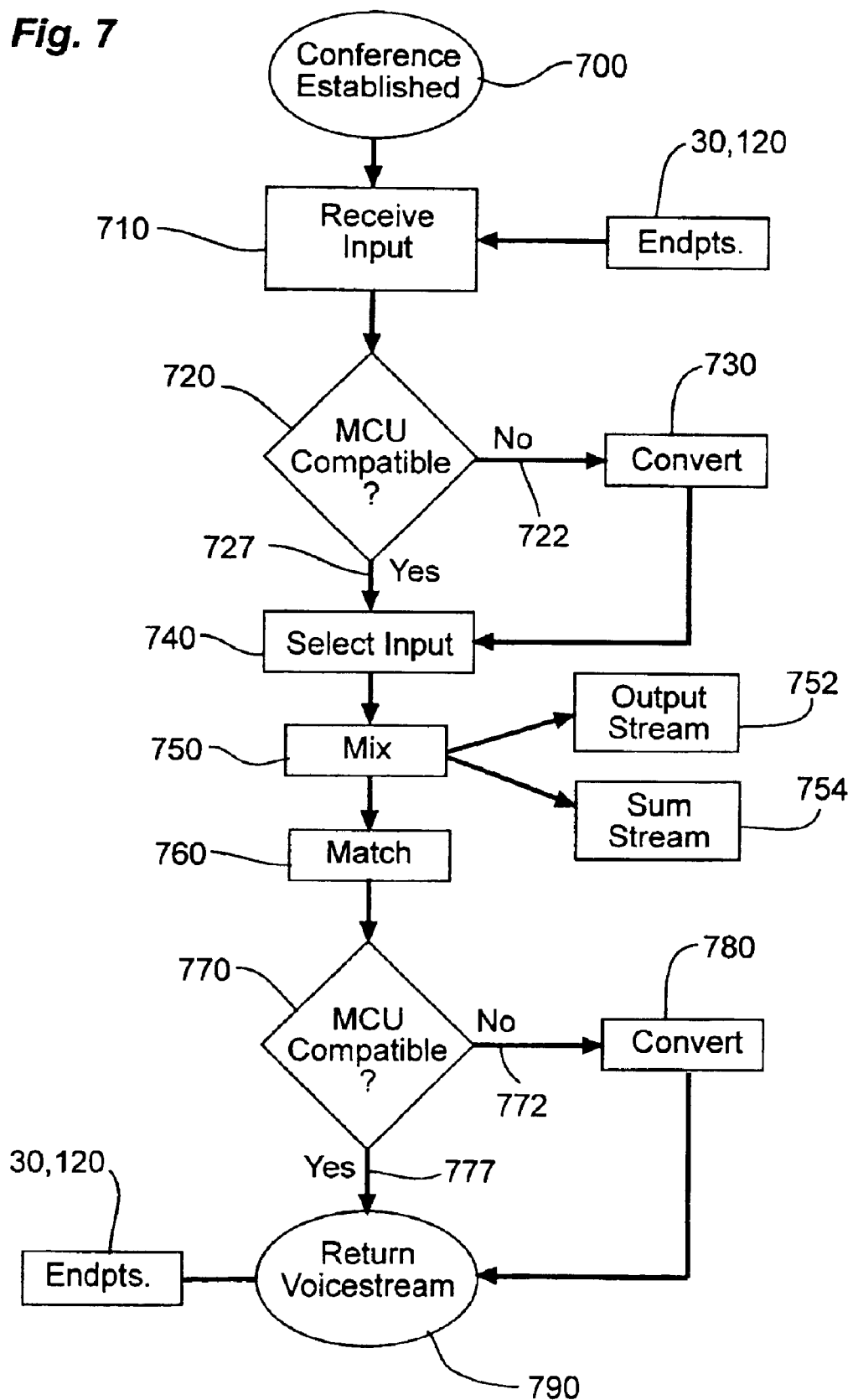
FIG. 7 is a flow chart illustrating a hybrid audio conferencing method of the present invention.

One embodiment of the audio conferencing method of the present invention implemented with the audio conference system 100 supporting a hybrid network (i.e., both the packet-based network 10 and the circuit-switched network 20) is shown in FIG. 7. In step 700, an audio conference is active (e.g., according to a method of establishing an audio conference discussed above). In step 710, audio input is received at the bridge server 50 through the media gateway 90, 95 from either or both GSTN endpoints 30 and packet-based endpoints 120. In step 720, if the audio input is incompatible 722 with the MCU 160, the audio input is converted to an MCU-usable format (e.g., packet input for a packet-based MCU or TDM for a TDM-based MCU) in step 730 by the media gateway 90, 95 and sent to the MCU 160. Otherwise, if the input is already in an MCU-usable format, the input need not be converted and is instead sent directly 727 to the MCU 160. In step 740, one or more inputs are selected by the MCU 160 based on predetermined selection criteria (e.g., strongest signal, loudest, clearest, a combination thereof, etc.). The selected inputs are conventionally mixed by the MCU 160 in step 750 to form an output stream 752 and a sum stream 754.

The output stream 752 represents the mixed input of each selected input except its corresponding input. The sum stream 754 on the other hand represents the mixed input of all selected inputs. For example, where PE1 through PE4 provide input to the bridge server 50, and PE1, PE2 and PE4 are selected, the output stream 752 to PE1 represents the mixed input of PE2 and PE4. Similarly, the output stream 752 returned to PE2 represents the mixed input of PE1 and PE4. The sum stream 754, on the other hand, which would be returned to PE3 (not selected for mixing), represents the mixed input of each selected input (PE1, PE2, and PE4).

In step 760, the output stream 752 is matched for distribution by the MCU 160 with the corresponding endpoint 30, 120 (i.e., as shown in the above example). In step 770, if the output stream 752 and the sum stream 754 are incompatible 772 with the endpoints 30, 120, the media gateway 90, 95 converts the output stream 752 and sum stream 754 to a format usable by the endpoints 30, 120 (e.g., TDM to packet signals) in step 780. Otherwise, the output stream 742 and sum stream 744 are returned directly 777 to the endpoints 30, 120. Either way, in step 790 the appropriate voice stream (i.e., the matched output stream 752 and/or sum stream 754) is returned to the endpoints 30, 120.

Each of the above-identified steps can be done conventionally using readily available telephony equipment according to the method of the present invention. It is the combination of each step that results in the method of the present invention. In addition, the audio format can be any suitable format (TDM, IP, etc.).

It is to be expressly understood that the order of steps 700–790 need not occur in the given order presented and variations thereto can occur. Furthermore, one or more steps may be omitted (e.g., steps 730 and 780 where the input is already in an MCU-usable format). Likewise, in some instances where each input is selected in step 740 for mixing in step 750 (e.g., in an audio conference with a limited number of participants), a sum stream 754 is always generated. These and other modifications to the present invention are illustrated in more detail below.

Figure 8:
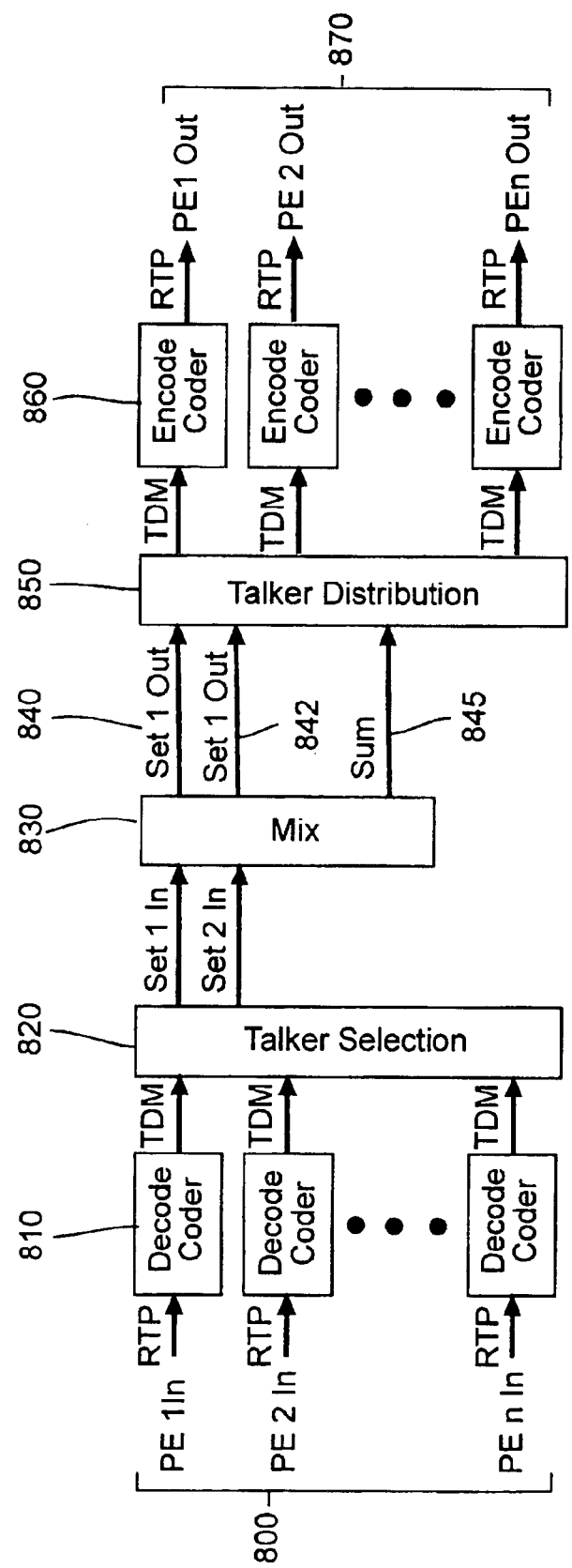
FIG. 8 shows an example of the hybrid audio conferencing method of FIG. 7.

An example of the audio conferencing method of FIG. 7 is shown in FIG. 8 where the MCU usable format is TDM and packet participants PE1 through PEn are participating in an active audio conference (step 700). Hence, packet input 800 is received by the media gateway 95 (e.g., corresponding to the packet-based network 10) (step 710) and decoded 810 (e.g., converted from packet to TDM format) (steps 720, 730). The MCU 160 receives the converted input and makes a selection 820 based upon predetermined selection criteria (e.g., audio quality, volume, signal strength, clarity, a combination thereof, etc.) (step 740). In the example of FIG. 8, the input corresponding to PE1 and PE2 are chosen for mixing 830 by the MCU 160 (step 750). Output streams 840, 842 corresponding to PE1 and PE2, respectively, and sum stream 845 (e.g., for return to PEn) are matched for distribution 850 by the MCU 160 (step 760) and sent back through the media gateway 95 for conversion 860 to packet format 870 (steps 770, 780), and then returned through the packet network 110 to the corresponding packet-based endpoints 120 (step 790). That is, output stream 840, once converted, is returned to PE1, output stream 842 is returned to PE2, and the sum stream 845 is returned to PEn. It is to be expressly understood that the above example is given merely to be illustrative, and is not intended to limit the method of the present invention in any way.

5. Full Service Audio Conferencing.

Planned audio conferencing conventionally requires an advance reservation against a specific MCU 160 or MCU pool 165 and operator assistance (high-touch) to facilitate the audio conference. Ad-hoc audio conferencing conventionally is able to support an audio conference without a reservation and without operator assistance by creating a conference against a single MCU 160. On the other hand, once an audio conference is established in the hybrid audio conferencing system 100 according to the method of the present invention, the audio conferencing system 100 offers full service audio conferencing that supports both planned and ad-hoc audio conferencing.

The method of the present invention implements full service audio conferencing by integrating the reservation system 155 of the planned audio conferencing system and the call agent 175 of the ad-hoc system. Ports 190, 195 utilized for each audio conferencing type can be dynamically driven by current loads to achieve maximum port utilization.

In one embodiment, the reservation system 155 and the call agent 175 are loosely integrated. That is, the master reservation system 155 conventionally used to reserve planned audio conferences on specific MCUs 160 in pool 165 keeps the ad-hoc call agent 175 informed as to the number of available ports 190 on each MCU 160 and the ad hoc call agent 175 conventionally manages the available ports 190. The number of available ports 190 on a given MCU 160 are monitored to ensure that all reservations can be serviced. For example, a port 190 that will be required to support a reservation in the next five minutes is not considered available (i.e., 195). Likewise, statistically expected ad-hoc usage is also monitored and accounted for.

In another embodiment, the reservation system 155 and the call agent 175 are tightly integrated. That is, the reservation system 155 is used to reserve planned audio conferences against MCU pool 165 but the reservation is not bound to a specific MCU 160. Instead, the audio conference is assigned to an MCU 160 by the call agent 175 when it is created and the call agent 175 continuously monitors the port usage and anticipated near term usage (i.e., reserved ports) of each MCU 160 in the pool 165 to determine the number and location of available ports 190. When an audio conference needs to be created (either a planned audio conference or an ad-hoc audio conference), the call agent 175 selects an appropriate MCU 160 to host the audio conference and ensures that all calls for a given audio conference are routed to the appropriate MCU 160. Thus, the call agent 175 determines the location of all audio conferences allowing for greater port utilization as well as better fault tolerance (i.e., audio conference requests will seldom be denied because available ports 190 are closely monitored).

6. Network Centric Call Transfer and Dynamic Routing.

Once an audio conference is established in the hybrid network according to the method of the present invention, the audio conference system 100 also facilitates dynamic call routing. A point-to-point connection is made using logical links (i.e., within the packet network 110) and a dedicated physical connection is not required (i.e., as in a GSTN). That is, the call data and associated control are sent via packets through the packet network 110 and each packet is sent individually to a destination address so that the physical route taken from end-to-end may vary from packet to packet (i.e., a call can be routed or transferred by simply renegotiating the destination address).

Thus, under the teachings of the present invention, calls can be routed to any MCU 160 within the MCU pool 165 allowing MCUs 160 to be geographically distributed and the audio conference network 100 to be large-scale. In addition, the ability to transfer a call from one MCU 160 to another allows the operator voice path to be routed to any MCU 160 in the system. This in turn allows an operator to service a large number of MCUs 160 and to quickly switch which MCU 160 their voice path terminates on.

In addition, an audio conference established in the hybrid network allows an audio conference participant to be moved from one audio conference to another, even where the audio conferences are on separate MCUs 160. The destination address of the packets are simply renegotiated to another MCU 160 instead of establishing a connection between the two MCUs 160, thus requiring fewer resources and reducing the load on any one MCU 160.

An audio conference established in the hybrid audio conferencing system 100 according to the method of the present invention also allows a new audio conference to be created on a different MCU 160 where an MCU 160 is taken out of service or otherwise unavailable to take additional participants (e.g., due to overflow, etc.). By transferring calls, the audio conference can be serviced by any MCU 160 in the system 100. All calls destined for a "umoved" audio conference are still statically routed to the original MCU 160, but immediately transferred to the correct MCU 160, thus service to the audio conference is not interrupted.

7. Receive Only Support.

Conference participants can be either active or passive. Participants that can both contribute to and receive audio input from an audio conference are active participants. Those that can only receive a voice stream from an audio conference are passive participants. Once an audio conference is established in the hybrid audio conferencing system 100 according to the method of the present invention, the audio conference supports both active and passive participants.

Support for passive participants can still be provided where there are only a limited number of participants by the MCU 160 the same as it is in a conventional circuit-switched network. That is, a full duplex connection can be established and the receive path simply ignored. However, the method of the present invention can also use broadcasting to support passive participants. That is, the audio conference output is directed to a streaming protocol server 185 (e.g., a real-time standard broadcast server (RTSP)). The streaming protocol server 185 uses the audio conference sum as its input, and passive participants can connect to the streaming protocol server 185 using conventional standards of service. As such, a large number of broadcast protocols can be supported, and a virtually unlimited number of passive participants can be supported with little or no impact on the conferencing MCU 160.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternate embodiments to the extent permitted by the prior art.

We claim:

1. An audio conferencing method in a hybrid network, said hybrid network having a plurality of endpoints connected to an audio conference therein, said audio conferencing method comprising the steps of:

receiving in a bridge server input from at least one endpoint in said plurality of endpoints connected to the audio conference;

selecting in said bridge server a multiple control unit from a plurality of multiple control units located at said bridge server to mix said received input to form an output stream and a sum stream;

matching the output stream with the at least one endpoint and the sum stream with other endpoints in said plurality of endpoints connected to the audio conference;

returning from said multiple control unit the output stream to the at least one endpoint and the sum stream to said other endpoints in said plurality of endpoints connected to the audio conference.

2. The method of claim 1 further supporting full service audio conferencing using a reservation system and a call agent.

3. The method of claim 2 wherein the reservation system and the call agent are tightly integrated.

4. The method of claim 2 wherein the reservation system and the call agent are loosely integrated.

5. The method of claim 1 further including the step of dynamically routing an operator voice path to service said plurality of multiple control units.

6. The method of claim 1 further including the step of renegotiating the destination of a voice path to move an audio conference participant from said selected multiple control unit to a second multiple control unit.

7. The method of claim 1 further including the step of moving said audio conference from said selected multiple control unit to a second multiple control unit.

8. The method of claim 1 further including the steps of:

providing said audio conference to a streaming protocol server from said selected multiple control unit;

connecting a passive participant to said streaming protocol server; and broadcasting said audio conference from said streaming protocol server to a passive participant.

9. The method of claim 1 wherein said plurality of endpoints has both circuit-switched endpoints and packet-based endpoints.

10. The method of claim 1 wherein said multiple control unit is part of a bridge server having a media gateway therein.

11. An audio conferencing method in a hybrid network, said hybrid network having a plurality of endpoints connected to an audio conference therein, said plurality of endpoints having both a circuit-switched endpoint and a packet-switched endpoint, said audio conferencing method comprising the steps of:

receiving in a media gateway input from a corresponding endpoint in said plurality of endpoints connected to the audio conference;

transferring said received input to a multiple control unit;

mixing in said multiple control unit the transferred received input with other input to form a) an output stream that is the sum of each input from said plurality of endpoints exclusive of the input from the corresponding endpoint and b) a sum stream;

matching a) the output stream with the corresponding endpoint and b) the sum stream with other endpoints in said plurality of endpoints connected to the audio conference;

returning the output stream to the corresponding endpoint and the sum stream to the other endpoints in said plurality of endpoints connected to the audio conference, said audio conference supporting full service conferencing in said audio conference to said endpoint with a reservation system and a call agent.

12. The method of claim 11 wherein the audio conference supports dynamically routed audio signals within said packet-switched network.

13. The method of claim 11 wherein the audio conference supports passive participants in said packet-switched network.

14. The method of claim 11 wherein the audio conference supports dial out from said audio conference to an additional endpoint.

15. The method of claim 11 wherein said media gateway and said multiple control unit are part of a bridge server.

16. An audio conferencing method in a hybrid network, said hybrid network having a plurality of endpoints connected to an audio conference therein, said plurality of endpoints having both a circuit-switched endpoint and a packet-switched endpoint, said audio conferencing method comprising the steps of:

receiving in a media gateway input from a corresponding endpoint in said plurality of endpoints connected to the audio conference;

transferring said received input to a multiple control unit;

mixing in said multiple control unit the transferred received input with other input to form a) an output stream that is the sum of each input from said plurality of endpoints exclusive of the input from the corresponding endpoint and b) a sum stream;

matching a) the output stream with the corresponding endpoint and b) the sum stream with other endpoints in said plurality of endpoints connected to the audio conference;

returning the output stream to the corresponding endpoint and the sum stream to the other endpoints in said plurality of endpoints connected to the audio conference.

17. The method of claim 16 further comprising:

converting in said media gateway the received input to a multiple-control-unit-usable format.

18. The method of claim 17 further comprising:

selecting in said media gateway the converted input.

19. The method of claim 16 further comprising:

transferring said matched output stream and said matched sum stream to said media gateway.

20. The method of claim 19 further comprising:

converting in said media gateway said matched output stream and said matched sum stream to an endpoint-usable format.

* * * * *